United States Patent
Ahn et al.

(10) Patent No.: US 8,443,123 B2
(45) Date of Patent: May 14, 2013

(54) UPNP CONTROL POINT AND UPNP DEVICE BASED ON THE UPNP NETWORK AND CONNECTING METHOD USING THE SAME

(75) Inventors: Sang Chul Ahn, Seoul (KR); Yong-Moo Kwon, Seoul (KR); Ju Young Park, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 161 days.

(21) Appl. No.: 12/787,197

(22) Filed: May 25, 2010

(65) Prior Publication Data

US 2011/0082922 A1    Apr. 7, 2011

(30) Foreign Application Priority Data

Oct. 6, 2009    (KR) .................... 10-2009-0094549

(51) Int. Cl.
*G06F 3/00*    (2006.01)
(52) U.S. Cl.
USPC ............ 710/63; 710/10; 710/104; 713/1; 709/220
(58) Field of Classification Search .......... 709/227, 709/220; 710/10, 104; 713/1
See application file for complete search history.

(56) References Cited

U.S. PATENT DOCUMENTS

| | | | | |
|---|---|---|---|---|
| 7,594,040 | B2 * | 9/2009 | Oshima et al. | 710/8 |
| 7,664,135 | B2 * | 2/2010 | Oshima et al. | 370/462 |
| 7,668,939 | B2 * | 2/2010 | Encarnacion et al. | 709/220 |
| 2005/0160172 | A1 * | 7/2005 | Eytchison | 709/227 |
| 2005/0188193 | A1 * | 8/2005 | Kuehnel et al. | 713/155 |
| 2005/0198227 | A1 * | 9/2005 | Nakama | 709/220 |
| 2006/0095574 | A1 * | 5/2006 | Stirbu et al. | 709/227 |
| 2007/0286100 | A1 * | 12/2007 | Saaranen et al. | 370/260 |
| 2008/0034127 | A1 * | 2/2008 | Nishio | 710/11 |
| 2009/0132737 | A1 * | 5/2009 | Huang et al. | 710/62 |

FOREIGN PATENT DOCUMENTS

KR    10-2004-0014731 A    2/2004

OTHER PUBLICATIONS

Bodlaender, UPnP 1.1—Designing for Performance & Compatibility, Feb. 5, ieee, vol. 50 No. 1, pp. 1-7.*

* cited by examiner

*Primary Examiner* — Ernest Unelus
(74) *Attorney, Agent, or Firm* — Fenwick & West LLP (57) ABSTRACT

Disclosed herein are a UPnP control point and a UPnP device based on the UPnP network and a connecting method using the same, in which a service connection is performed. The service connection is restrictedly performed using a configuration file defined to allow or deny a connection with a specific device on the UPnP network, so that only devices specified by a user can be connected.

21 Claims, 7 Drawing Sheets

```
# Control Point
[allow]
 All : All
[deny]
 Printer : 203. 100. 100. 10
 Printer : 203. 100. 100. 11
```

FIG. 4B

```
# device
[allow]
 Printer 00 : 192. 168. 0. 3   192. 168. 0. 10
[deny]
 All : All
```

FIG. 5

```
# Control Point
[allow]
 All : All
[deny]
 All : 203. 100. 100. 10
 Printer : 203. 100. 100. 11
```

UPNP CONTROL POINT AND UPNP DEVICE BASED ON THE UPNP NETWORK AND CONNECTING METHOD USING THE SAME

CROSS-REFERENCE TO RELATED APPLICATION

This application claims priority under 35 U.S.C. §119(a) from Republic of Korea Patent Application No. 10-2009-0094549, filed on Oct. 6, 2009, which is hereby incorporated by reference for all purposes as if fully set forth herein.

BACKGROUND

1. Field of the Invention

Disclosed herein are a UPnP control point and a UPnP device based on the UPnP network and a connecting method using the same, in which a service connection is restrictedly performed using a configuration file defined to allow or deny a connection with a specific device on the UPnP network.

2. Description of the Related Art

Universal plug and play (UPnP) technology is a technology that enables information appliances connected on a network to communicate with each other without a complicated configuration procedure. The UPnP technology allows one appliance to automatically detect services provided by other appliances. In the UPnP technology, if a user allows an appliance to be connected to a network, appliances previously connected to the network automatically detect and control the newly added appliance.

UPnP is a middleware architecture that allows several devices to be connected in a peer-to-peer fashion. The UPnP allows command and control to be performed between devices on a network, independently of specific operating systems, programming languages and media. The UPnP uses existing protocols such as internet protocol (IP), transmission control protocol (TCP), user datagram protocol (UDP), hypertext transfer protocol (HTTP) and extensible markup language (XML). Data exchanged between devices are expressed using the XML and communicated using the HTTP. Non-IP networks can be connected through bridges.

SUMMARY OF THE INVENTION

Disclosed herein are a universal plug and play (UPnP) control point and a UPnP device based on a UPnP network and a connecting method using the same, in which a connection with a specific device can be restricted through a firewall function using a configuration file for allowance or denial of connection on the UPnP network.

According to an aspect of the present invention, there is provided a UPnP control point based on the UPnP network, comprising a memory unit for storing a configuration file for allowance or denial of a connection with a UPnP device; a communication unit for communicating with the UPnP device on the UPnP network; a control unit for transmitting a simple service discovery protocol (SSDP) search request to the UPnP device through the communication unit, when an SSDP response corresponding to the SSDP search request is received from the UPnP device, the control unit analyzing the configuration file stored in the memory unit and determining whether or not to allow the connection with the UPnP device that transmits the SSDP response; and an interface unit for performing a service connection with the UPnP device of which connection is allowed based on the determined result of the control unit.

The configuration file contains a friendly name and internet protocol (IP) address of the UPnP device on the UPnP network or arbitrary information for distinguishing the UPnP device from other UPnP devices.

According to an aspect of the present invention, there is provided a UPnP device based on the UPnP network, comprising: a memory unit for storing a configuration file for allowance or denial of a connection with a UPnP control point; a communication unit for communicating with the UPnP control point on the UPnP network; a control unit for transmitting an SSDP response to the UPnP control point through the communication unit when an SSDP search request is received from the UPnP control point on the UPnP network, the control unit analyzing the configuration file stored in the memory unit and determining whether or not to allow the connection with the UPnP control point that transmits the SSDP search request; and an interface unit for performing a service connection with the UPnP control point of which connection is allowed based on the determined result of the control unit.

The configuration file contains a friendly name and IP address of the UPnP control point on the UPnP network or arbitrary information for distinguishing the UPnP control point from other UPnP control points.

According to another aspect of the present invention, there is provided a UPnP control point based on the UPnP network, comprising: a memory unit for storing a configuration file for allowance or denial of a connection with a UPnP device; a communication unit for communicating with the UPnP device on the UPnP network; a control unit for analyzing the configuration file stored in the memory unit and determining whether or not to allow the connection with the UPnP device that transmits an advertisement when the advertisement is received from the UPnP device; and an interface unit for performing a service connection with the UPnP device of which connection is allowed based on the determined result of the control unit.

The configuration file contains a friendly name and internet protocol (IP) address of the UPnP device on the UPnP network or arbitrary information for distinguishing the UPnP device from other UPnP devices.

According to another aspect of the present invention, there is provided a UPnP device based on the UPnP network, comprising: a memory unit for storing a configuration file for allowance or denial of a connection with a UPnP control point; a communication unit for communicating with the UPnP control point on the UPnP network; a control unit for transmitting an advertisement to the UPnP control point through the communication unit, when a description request is received from the UPnP control point on the UPnP network, the control unit analyzing the configuration file stored in the memory unit and determining whether or not to allow the connection with the UPnP control point that transmits the description request; and an interface unit for performing a service connection with the UPnP control point of which connection is allowed based on the determined result of the control unit.

The configuration file contains a friendly name and IP address of the UPnP control point on the UPnP network or arbitrary information for distinguishing the UPnP control point from other UPnP control points.

The control unit may transmit a dummy device description through the communication unit to the UPnP control point of which connection is denied based on the determined result of the control unit.

According to an aspect of the present invention, there is provided a connecting method using devices based on the UPnP network, the method comprising: storing a configuration file for allowance or denial of a connection with a UPnP device in a UPnP control point; allowing the UPnP control point to transmit an SSDP search request to the UPnP device on the UPnP network; when an SSDP response corresponding to the SSDP search request is received from the UPnP device, allowing the UPnP control point to analyze the configuration file and determine whether or not to allow the connection with the UPnP device that transmits the SSDP response; and when the connection with the UPnP device is allowed based on the determined result, allowing the UPnP control point to send a description request to the UPnP device of which connection is allowed based on the determined result.

The configuration file contains a friendly name and IP address of the UPnP device on the UPnP network or arbitrary information for distinguishing the UPnP device from other UPnP devices.

According to another aspect of the present invention, there is provided a connecting method using devices based on the UPnP network, the method comprising: storing a configuration file for allowance or denial of a connection with a UPnP control point in a UPnP device; when an SSDP search request is received by the UPnP device from the UPnP control point on the UPnP network, allowing the UPnP device to analyze the configuration file and determine whether or not to allow the connection with the UPnP control point that transmits the SSDP search request; and when the connection with the UPnP control point is allowed based on the determined result, allowing the UPnP device to transmit an SSDP response to the UPnP control point of which connection is allowed based on the determined result.

The configuration file contains a friendly name and IP address of the UPnP control point on the UPnP network or arbitrary information for distinguishing the UPnP control point from other UPnP control points.

According to still another aspect of the present invention, there is provided a connecting method using devices based on the UPnP network, the method comprising: storing a configuration file for allowance or denial of a connection with a UPnP device in a UPnP control point; when an advertisement is received by the UPnP control point from the UPnP device on the UPnP network, allowing the UPnP control point to analyze the configuration file and determine whether or not to allow the connection with the UPnP device that transmits the advertisement; and when the connection with the UPnP device is allowed based on the determined result, allowing the UPnP control point to perform a service connection with the UPnP device of which connection is allowed based on the determined result.

The configuration file contains a friendly name and IP address of the UPnP device on the UPnP network or arbitrary information for distinguishing the UPnP device from other UPnP devices.

According to still another aspect of the present invention, there is provided a connecting method using devices based on the UPnP network, the method comprising: storing a configuration file for allowance or denial of a connection with a UPnP control point in a UPnP device; allowing the UPnP device to transmit an advertisement to the UPnP control point on the UPnP network; when a description request corresponding to the advertisement is received by the UPnP device from the UPnP control point on the UPnP network, allowing the UPnP device to analyze the configuration file and determine whether or not to allow the connection with the UPnP control point that transmits the description request; and when the connection with the UPnP control point is allowed based on the determined result, allowing the UPnP device to send a device description to the UPnP control point of which connection is allowed based on the determined result.

The configuration file contains a friendly name and IP address of the UPnP control point on the UPnP network or arbitrary information for distinguishing the UPnP control point from other UPnP control points.

The allowing the UPnP device to send a device description to the UPnP control point further includes, allowing the UPnP device to send a dummy device description to the UPnP control point of which connection is denied based on the determined result when the connection with the UPnP control point is denied based on the determined result.

BRIEF DESCRIPTION OF THE DRAWINGS

The above and other aspects, features and advantages of the present invention will become apparent from the following description of preferred embodiments given in conjunction with the accompanying drawings.

DETAILED DESCRIPTION OF THE INVENTION

Exemplary embodiments now will be described more fully hereinafter with reference to the accompanying drawings, in which exemplary embodiments are shown. This disclosure may, however, be embodied in many different forms and should not be construed as limited to the exemplary embodiments set forth therein. Rather, these exemplary embodiments are provided so that this disclosure will be thorough and complete, and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first", "second", and the like does not imply any particular order, but they are included to identify individual elements. Moreover, the use of the terms first, second, etc. does not denote any order or importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In the drawings, like reference numerals in the drawings denote like elements. The shape, size and regions, and the like, of the drawing may be exaggerated for clarity.

Hereinafter, exemplary embodiments of the present invention will be described in detail with reference to the accompanying drawings.

Figure 1:
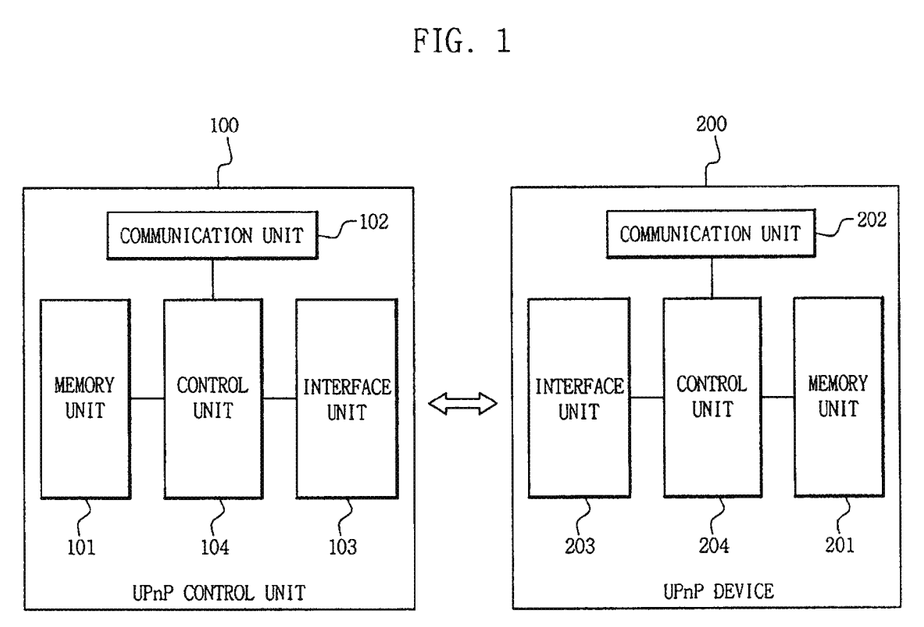
FIG. 1 is a block diagram illustrating the configuration of devices on the UPnP network according to an embodiment of this disclosure.

FIG. 1 is a block diagram illustrating the configuration of devices on the universal plug and play (UPnP) network according to an embodiment of this disclosure.

Referring to FIG. 1, the devices on the UPnP network comprises a UPnP control point 100 and a UPnP device 200. A configuration file defined by a user may be stored in the UPnP control point 100 or the UPnP device200. The configuration file allows one device having the configuration file stored therein to determine whether or not to allow a connection with the other device before the service connection.

The UPnP control point 100 according to the embodiment comprises a memory unit 101, a communication unit 102, an interface unit 103 and a control unit 104.

The memory unit 101 stores a configuration file for allowance or denial of a connection with a UPnP device. The configuration file may contain a friendly name and IP address for distinguishing a device from other devices on the UPnP network, arbitrary information for distinguishing a device from other devices, or the like. The friendly name refers to a name that represents each device or application and includes a device classification type and the like. Each item of the configuration file is specified for each device or application to restrict whether or not to allow a connection with each of the devices or applications. The arbitrary information for distinguishing a device from other devices may contain a device type, a unique device name (UDN) of the device, device manufacturing information, device model information, and the like.

The communication unit 102 performs communications with the UPnP device 200 on the UPnP network. A simple service discovery protocol (SSDP) search request is transmitted to the UPnP device 200 by the UPnP control point 100 through the communication unit 102 when the UPnP control point 100 is connected to the UPnP network. A SSDP response corresponding to the SSDP search request is received by the UPnP control point 100 through the communication unit 102. When the UPnP device 200 is connected to the UPnP network, an advertisement in general event notification architecture (GENA) format from the UPnP device is received through the communication unit 102 and a description request corresponding to the advertisement is transmitted to the UPnP device 200.

The interface unit 103 performs a service connection with the UPnP device 200 on the UPnP network. When a signal for allowance of connection is inputted to the interface unit 103 from the control unit 104, the interface unit 103 performs a service connection with the UPnP device of which connection is allowed based on the signal for allowance of connection inputted from the control unit 104.

The control unit 104 transmits an SSDP search request to UPnP devices through the communication unit 102. If an SSDP response corresponding to the SSDP search request or an advertisement is received from an arbitrary UPnP device through the communication unit 102, the control unit 104 analyzes a configuration file stored in the memory unit 101 and determines whether or not to allow a connection with the UPnP device. The determined result contains information on allowance or denial of the connection with the UPnP device that transmits the SSDP response or the advertisement. The configuration file may be defined to contain a friendly name and IP address of a UPnP device on the UPnP network. Therefore, the control unit 104 may determine whether or not to allow the connection with the UPnP device corresponding to the friendly name and IP address based on the definition of the configuration file. The configuration file includes plurality of items and each item of the configuration file may be defined as a command for allowing or denying a connection with all UPnP devices or a specific UPnP device on the UPnP network. Therefore, the control unit 104 may analyze the item defined with respect to the specific UPnP device prior to that defined with respect to all the UPnP devices, and determine whether or not to allow the connection with the UPnP device. For example, if each item of the configuration file is defined as "Printer: 203.100.100.11" with respect to a UPnP device of which connection is allowed to an arbitrary application and defined as "All:All" with respect to a UPnP device of which connection is denied, the control unit 104 determines that a connection with a specific UPnP device is first allowed to the printer corresponding to IP address 203.100.100.11 based on the item of the configuration file defined with respect to the specific UPnP device and that connections of all the other UPnP devices are denied. Thus, if an SSDP response or an advertisement is received from the printer corresponding to IP address 203.100.100.11, the control unit 104 allows the connection of the printer corresponding to IP address 203.100.100.11 based on the configuration file. However, if SSDP responses or advertisements are received from all the other UPnP devices, the control unit 104 denies the connection of all other UPnP devices. The control unit 104 may control SSDP search requests to be simultaneously transmitted to a plurality of UPnP devices on the UPnP network.

The UPnP device 200 according to the embodiment comprises memory unit 201, communication unit 202, interface unit 203, and control unit 204. The plurality of UPnP devices may exist on the UPnP network, and the UPnP control point 100 may communicate with the plurality of UPnP devices through multicasting of SSDP search requests.

The memory unit 201 has the same function as the memory unit 101 of the UPnP control point 100 and stores a configuration file for allowance or denial of the connection with the UPnP control point 100. The configuration file may be defined identical to that stored in the UPnP control point 100.

The communication unit 202 performs communications with the UPnP control point 100 on the UPnP network. An SSDP search request is received by a UPnP device from the UPnP control point 100 through the communication unit 202 and an SSDP response corresponding to the SSDP search request is transmitted to the UPnP control point 100 through the communication unit 202. When the UPnP device 200 is connected to the UPnP network, an advertisement in GENA format is transmitted to the UPnP control point 100 through the communication unit 202 and a description request corresponding to the advertisement is received from the UPnP control unit 100. The interface unit 203 performs a service connection with the UPnP control point 100 on the UPnP network. When a signal for allowance of connection is inputted from the control unit 204, the interface unit 203 performs the service connection with the UPnP control point 100 of which connection is allowed.

The control unit 204 transmits an SSDP response or an advertisement through the communication unit 202. The control unit 204 analyzes a configuration file stored in the memory unit 201 and determines whether or not to allow a connection with the UPnP control point 100 that transmits an SSDP search request or a description request. Like the control unit 104 of the UPnP control point 100, the determined result contains information on allowance or denial of the connection with the UPnP control point 100. Specifically, when the connection with the UPnP control point 100 is allowed based on the determined result, the control unit 204 sends a device description to the UPnP control point 100 to perform a service connection with the UPnP control point of which connection is allowed based on the determined result of the control unit. While, when the connection with the UPnP control point 100 is denied based on the determined result, the control unit 204 does not perform any action to terminate the process. Alternatively, the control unit 204 may send a dummy device description to the UPnP control point 100 to avoid generating useless network loads. The configuration file may be defined identical to that stored in the UPnP control point 100. Therefore, the configuration file may contain a friendly name and IP address, and each item of the configuration file may be defined with respect to a specific UPnP control point or all UPnP control points. The control unit 204 may analyze the item defined with respect to the specific UPnP control point prior to that defined with all the UPnP control points and determine whether or not to allow a connection with the UPnP control point.

Figure 2A:
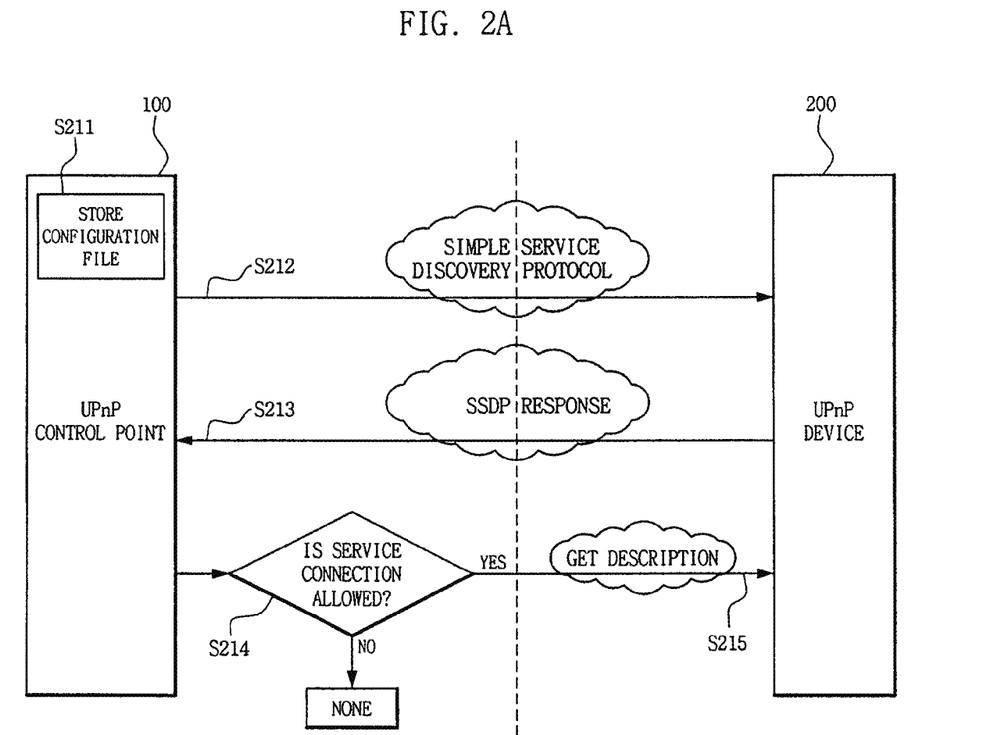
FIGS. 2A and 2B are views illustrating connecting processes of a UPnP control point and a UPnP device based on the UPnP network according to an embodiment of this disclosure.
Figure 2B:
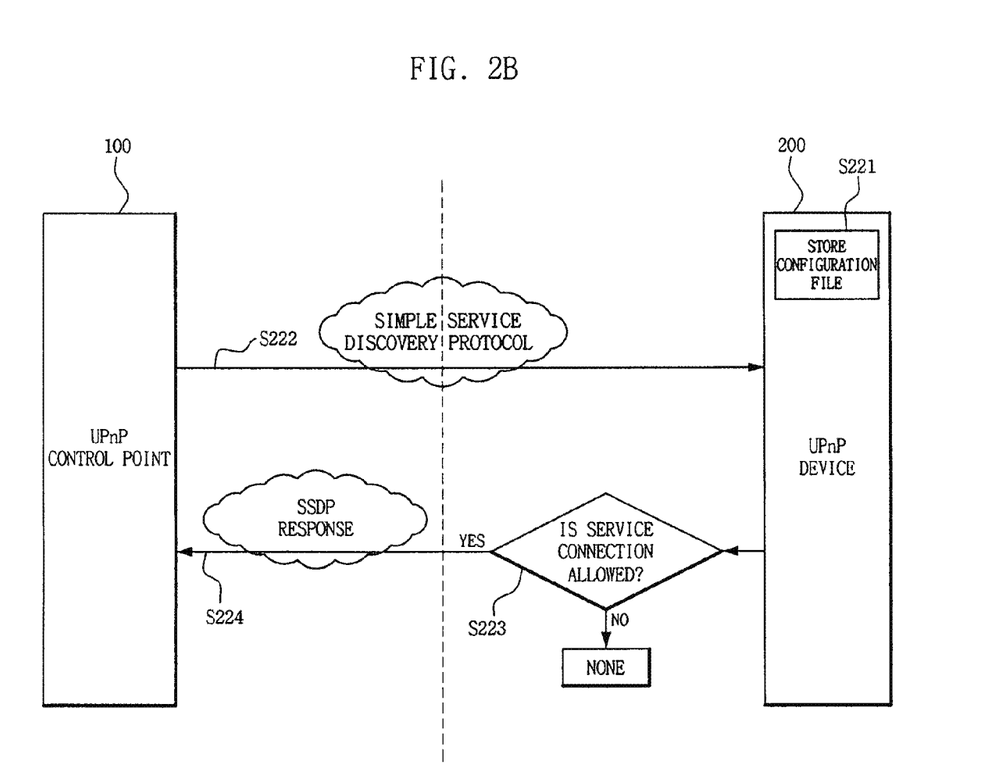

FIGS. 2A and 2B are views illustrating connecting processes of a UPnP control point 100 and a UPnP device 200 based on the UPnP network according to an embodiment of this disclosure. FIGS. 2A and 2B are views illustrating connecting processes in case that the UPnP control point 100 is connected to the UPnP network.

FIG. 2A is a view illustrating a connecting process of the UPnP control point 100 and the UPnP device 200 when a configuration file is stored in the UPnP control point 100, and FIG. 2B is a view illustrating a connecting process of the UPnP control point 100 and the UPnP device 200 when a configuration file is stored in the UPnP device 200. The embodiment may be provided as a combination of FIGS. 2A and 2B.

Referring to FIG. 2A, a configuration file is stored in the UPnP control point 100 (S211), and the UPnP control point 100 transmits an SSDP search request to the UPnP device 200 (S212). If an SSDP response corresponding to the SSDP search request is received by the UPnP control point 100 from the UPnP device 200 (S213), the UPnP control point 100 analyzes the configuration file and determines whether or not to allow a connection with the UPnP device 200 that transmits the SSDP response (S214). If it is determined that the connection with the UPnP device 200 is allowed, the UPnP control point 100 sends a description request to the UPnP device 200 (S215). Continuously, the UPnP control point 100 performs a service connection with the UPnP device 200.

Referring to FIG. 2B, a configuration file is stored in the UPnP device 200 (S221). If an SSDP search request is received by the UPnP device 200 from the UPnP control point 100 (S222), the UPnP device 200 analyzes the configuration file and determines whether or not to allow a connection with the UPnP control point 100 that transmits the SSDP search request (S223). If it is determined that the connection with the UPnP control point 100 is allowed, the UPnP device 200 transmits a SSDP response to the UPnP control point 100 (S224). Continuously, the UPnP device 200 performs a service connection with the UPnP control point 100.

Figure 3A:
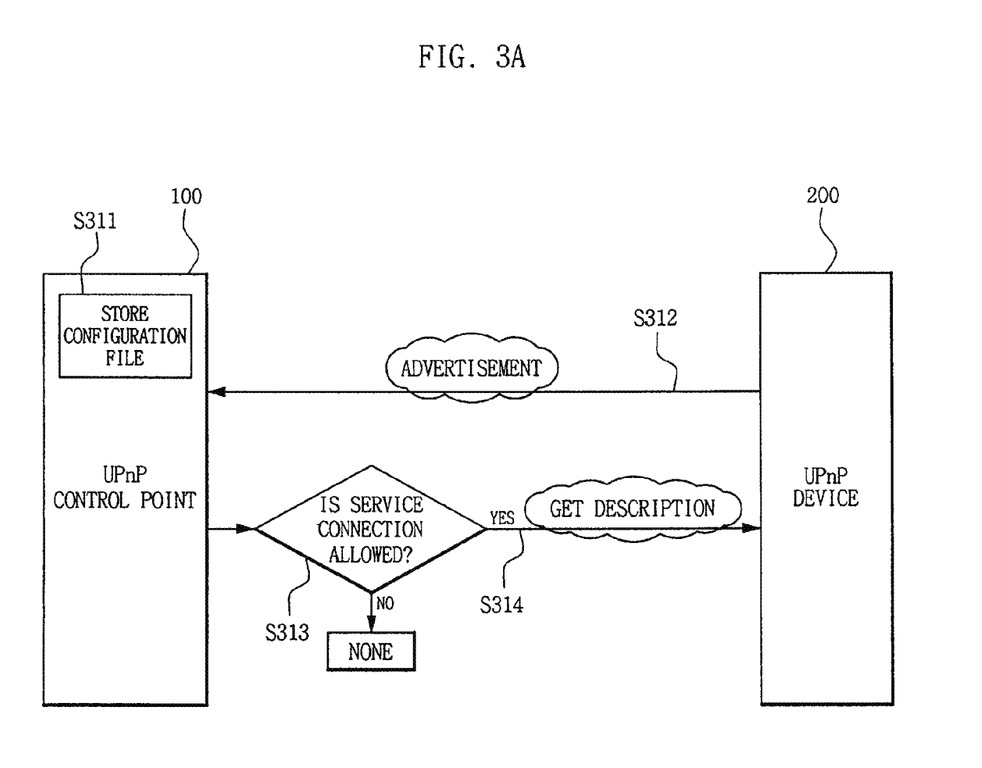
FIGS. 3A, 3B and 3C are views illustrating connecting processes of a UPnP control point and a UPnP device based on the UPnP network according to another embodiment of this disclosure.
Figure 3B:
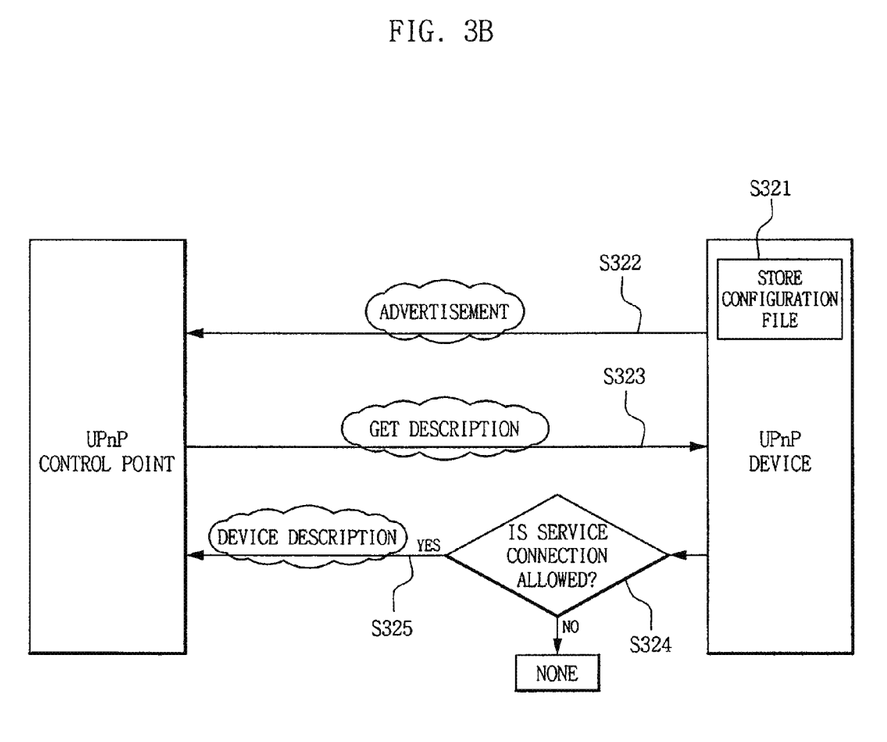
Figure 3C:
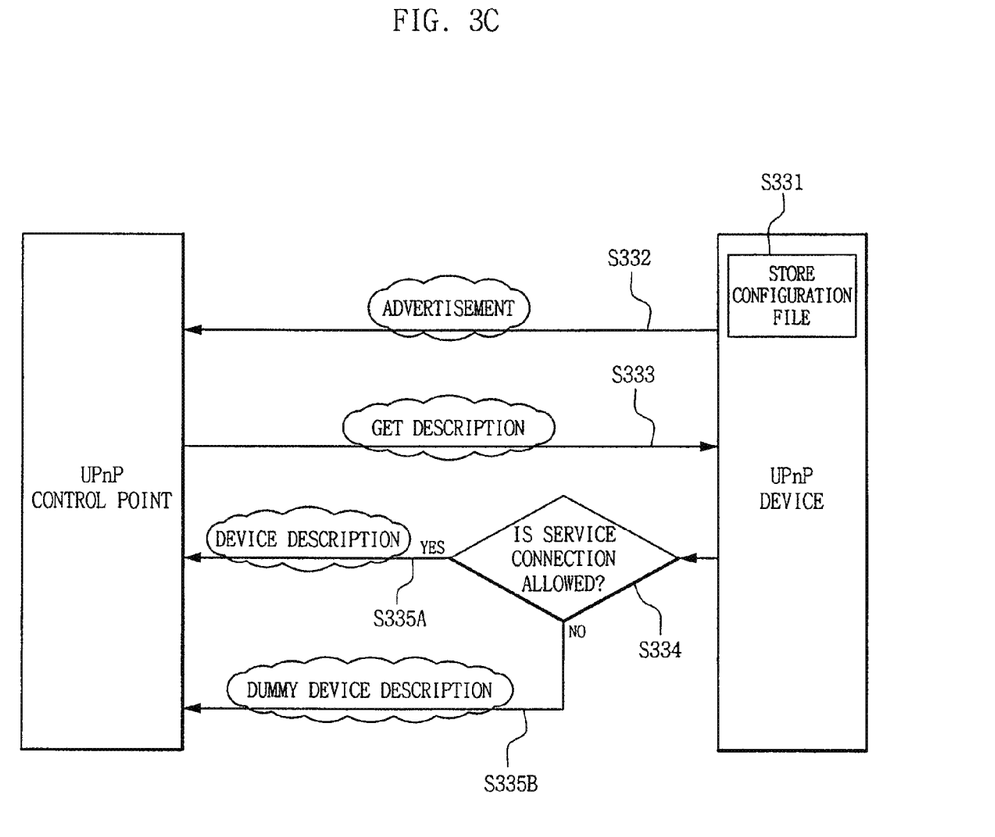

FIGS. 3A, 3B and 3C are views illustrating connecting processes of a UPnP control point 100 and a UPnP device 200 based on the UPnP network according to another embodiment of this disclosure. FIGS. 3A, 3B and 3C are views illustrating connecting processes in case that the UPnP device 200 is connected to the UPnP network.

FIG. 3A is a view illustrating a connecting process of the UPnP control point 100 and the UPnP device 200 when a configuration file is stored in the UPnP control point 100, and FIG. 3B and FIG. 3C are views illustrating a connecting process of the UPnP control point 100 and the UPnP device 200 when a configuration file is stored in the UPnP device 200. The embodiment may be provided as a combination of FIGS. 3A, 3B and 3C.

Referring to FIG. 3A, a configuration file is stored in the UPnP control point 100 (S311). If an advertisement is received by the UPnP control point device 100 from the UPnP device (S312), the UPnP control point 100 analyzes the configuration file and determines whether or not to allow a connection with the UPnP device 200 that transmits the advertisement (S313). If it is determined that the connection with the UPnP device 200 is allowed, the UPnP control point 100 transmits a description request to the UPnP device 200 (S314). Continuously, the UPnP control point 100 performs a service connection with the UPnP device 200.

Referring to FIG. 3B, a configuration file is stored in the UPnP device 200 (S321) and the UPnP device 200 transmits an advertisement to the UPnP control point 100 (S322). If a description request corresponding to the advertisement is received by the UPnP device 200 from the UPnP control point 100 (S323), the UPnP device 200 analyzes the configuration file and determines whether or not to allow a connection with the UPnP control point 100 that transmits the description request (S324). If it is determined that the connection with the UPnP control point 100 is denied, the UPnP device 200 may not perform any action, while the connection with the UPnP control point 100 is allowed, the UPnP device 200 transmits a device description to the UPnP control point 100 (S325). Continuously, the UPnP device 200 performs a service connection with the UPnP control point 100.

Referring to FIG. 3C, a configuration file is stored in the UPnP device 200 (S331) and the UPnP device 200 transmits an advertisement to the UPnP control point 100 (S332). If a description request corresponding to the advertisement is received by the UPnP device 200 from the UPnP control point 100 (S333), the UPnP device 200 analyzes the configuration file and determines whether or not to allow a connection with the UPnP control point 100 that transmits the description request (S334). If it is determined that the connection with the UPnP control point 100 is denied, the UPnP device 200 transmits a dummy device description to the UPnP control point 100 (S335B), while the connection with the UPnP control point 100 is allowed, the UPnP device 200 transmits a device description to the UPnP control point100 (S335A). Continuously, the UPnP device 200 performs a service connection with the UPnP control point 100.

Figure 4A:
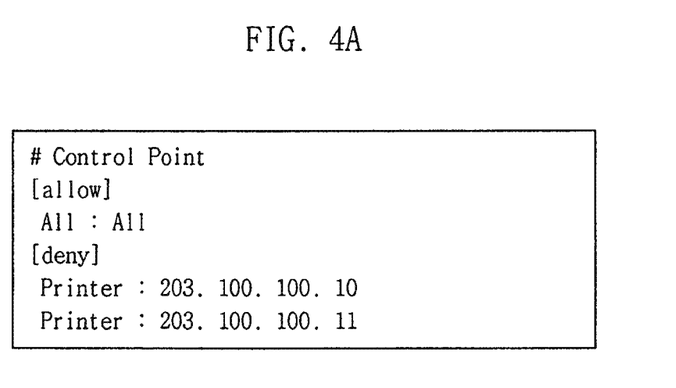
FIGS. 4A and 4B are views illustrating configuration files stored in a UPnP control point or UPnP device according to an embodiment of this disclosure.
Figure 4B:
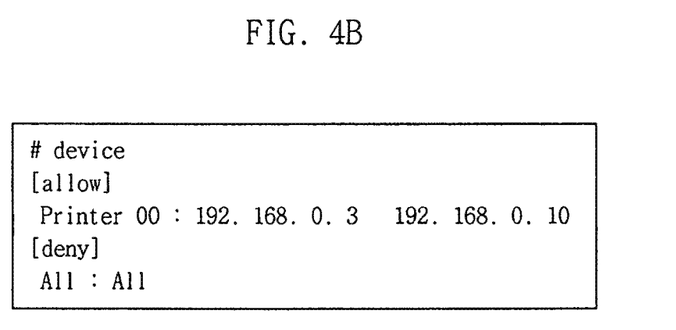

FIGS. 4A and 4B are views illustrating configuration files stored in a UPnP control point or UPnP device according to an embodiment of this disclosure.

FIG. 4A is a view illustrating a configuration file stored in a UPnP control point, and FIG. 4B is a view illustrating a configuration file stored in a UPnP device.

Referring to FIG. 4A, in the configuration file defined by a user, the type of a device having the configuration file stored therein is first defined ("#Control Point"). Sequentially, UPnP devices are defined, of which connections with the UPnP control point are allowed, and UPnP devices are defined, of which connections with the UPnP control point are denied. The configuration file of FIG. 4A is defined using a friendly name: IP address. According to the configuration file of FIG. 4A, the UPnP control point is controlled from "[allow] All: All" to allow connections with all UPnP devices corresponding to all IP addresses and is controlled from "[deny] Printer: 203.100.100.10/Printer:203.100.100.11" to deny connections with a printer corresponding to IP address 203.100.100.10 and a printer corresponding to IP address 203.100.100.11.

Similarly to FIG. 4A, in the configuration file of FIG. 4B, the type of a device having the configuration file stored therein is first defined (#device). Subsequently, UPnP control points are defined, of which connections with the UPnP device are allowed, and UPnP control points are defined, of which connections with the UPnP device are denied. According to the configuration file of FIG. 4B, the UPnP device is controlled from "[allow] Printer00:192.168.0.3 192.168.0.10" to allow a connection with a printer00 corresponding to IP address 192.168.0.3 or 192.168.0.10 and is controlled from "[deny] All:All" to deny connections with all UPnP control points corresponding to all IP addresses. In this case, a UPnP control point for allowance of connection and a UPnP control point for denial of connection, defined in the configuration file, may come into conflict with each other, and therefore, the configuration file defined with respect to a specific device may be determined prior to that defined with respect to all devices.

Figure 5:
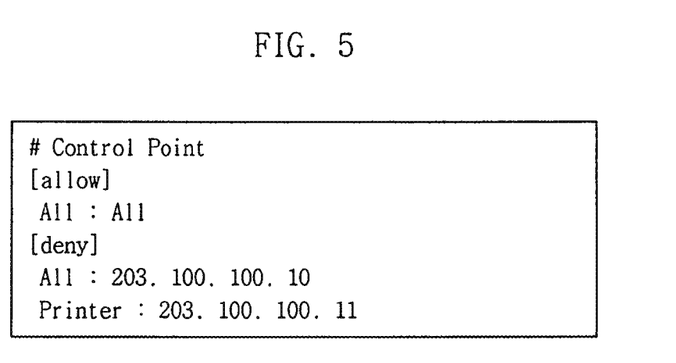
FIG. 5 is a view illustrating a configuration file in which a connection with all devices or a specific device with a specific IP address is defined.

FIG. 5 is a view illustrating a configuration file in which a connection with all devices or a specific device with a specific IP address is defined of this disclosure.

Referring to FIG. 5, the configuration file is inputted to a UPnP control point. According to the configuration file, the UPnP control point is controlled from "[allow] All:All" to allow connections with all UPnP devices corresponding to all IP addresses and is controlled from "[deny] All:203.100.100.10 Printer:203.100.100.11" to deny connections with all UPnP devices corresponding to IP address 203.100.100.10 and a connection with a printer corresponding to IP address 203.100.100.11. In this case, the configuration file defined with respect to a specific device is determined prior to that defined with respect to all devices, and therefore, the UPnP control point determines priority in the order of "[deny] printer:203.100.100.11", "[deny] All:203.100.100.10" and "[allow] All:All". Thus, the UPnP control point denies the connection with the printer corresponding to the IP address 203.100.100.11 and the connection with all the UPnP devices corresponding to the IP address 203.100.100.10. The UPnP control point allows connections with all UPnP devices corresponding to the other IP addresses.

The UPnP control point and the UPnP device based on the UPnP network, disclosed herein, are not limited to the configurations and methods of the aforementioned embodiments. The embodiments may be configured by selectively combining the entire or some of the embodiments so that various changes are made thereto.

As described above, in a UPnP control point and a UPnP device based on the UPnP network and a connecting method using the same according to at least one embodiment, the UPnP network can be stabilized by restricting or specifically allowing connections between devices.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A universal plug and play (UPnP) control point based on a UPnP network, comprising:
    a memory unit for storing a configuration file for allowance or denial of a connection with a UPnP device before a UPnP service connection;
    a communication unit for communicating with the UPnP device on the UPnP network;
    a control unit for transmitting a simple service discovery protocol (SSDP) search request to the UPnP device through the communication unit, when an SSDP response corresponding to the SSDP search request is received from the UPnP device, the SSDP response including UPnP device information, the control unit determining whether or not to allow the connection with the UPnP device that transmits the SSDP response by matching the UPnP device information with either allowed UPnP device information in the configuration file or denied UPnP device information in the configuration file; and
    an interface unit for performing the UPnP service connection with the UPnP device of which connection is allowed based on the determined result of the control unit.

2. The UPnP control point according to claim 1, wherein the configuration file contains a friendly name and internet protocol (IP) address of the UPnP device on the UPnP network or arbitrary information for distinguishing the UPnP device from other UPnP devices.

3. The UPnP control point according to claim 1, wherein each item of the configuration file is defined as a command for allowing or denying a connection with a specific UPnP device or all UPnP devices on the UPnP network, and the control unit analyzes the item defined with respect to a specific UPnP device prior to that defined with respect to all the UPnP devices and determines whether or not to allow the connection with the specific UPnP device.

4. The UPnP control point according to claim 1, wherein each item of the configuration file is defined for each service application of the UPnP device.

5. A universal plug and play (UPnP) device based on a UPnP network, comprising:
    a memory unit for storing a configuration file for allowance or denial of a connection with a UPnP control point before a UPnP service connection;
    a communication unit for communicating with the UPnP control point on the UPnP network;
    a control unit for transmitting an SSDP a simple service discovery protocol (SSDP) response to the UPnP control point through the communication unit when an SSDP search request is received from the UPnP control point on the UPnP network, the SSDP search request including UPnP control point information, the control unit determining whether or not to allow the connection with the UPnP control point that transmits the SSDP search request, by matching the UPnP control point information in the search request with either allowed UPnP control point information in the configuration file or denied UPnP control point information in the configuration file; and an interface unit for performing the UPnP service connection with the UPnP control point of which connection is allowed based on the determined result of the control unit.

6. The UPnP device according to claim 5, wherein the configuration file contains a friendly name and IP address of the UPnP control point on the UPnP network or arbitrary information for distinguishing the UPnP control point from other UPnP control points.

7. The UPnP device according to claim 5, wherein each item of the configuration file is defined as a command for allowing or denying a connection with a specific UPnP control point or all UPnP control points on the UPnP network, and the control unit analyzes the item defined with respect to a specific UPnP control point prior to that defined with respect to all UPnP control points and determines whether or not to allow the connection with the specific UPnP control point.

8. A universal plug and play (UPnP) control point based on a UPnP network, comprising:
  a memory unit for storing a configuration file for allowance or denial of a connection with a UPnP device before a UPnP service connection;
  a communication unit for communicating with the UPnP device on the UPnP network;
  a control unit for determining whether or not to allow the connection with the UPnP device that transmits an advertisement using a general event notification architecture (GENA) when the advertisement is received from the UPnP device, the advertisement including UPnP device information, by matching the UPnP device information in the advertisement with either allowed UPnP device information in the configuration file or denied UPnP device information in the configuration file; and
  an interface unit for performing the UPnP service connection with the UPnP device of which connection is allowed based on the determined result of the control unit.

9. The UPnP control point according to claim 8, wherein the configuration file contains a friendly name and internet protocol (IP) address of the UPnP device on the UPnP network or arbitrary information for distinguishing the UPnP device from other UPnP devices.

10. A universal plug and play (UPnP) device based on a UPnP network, comprising:
  a memory unit for storing a configuration file for allowance or denial of a connection with a UPnP control point before a UPnP service connection;
  a communication unit for communicating with the UPnP control point on the UPnP network;
  a control unit for transmitting an advertisement using a general event notification architecture (GENA) to the UPnP control point through the communication unit, when a description request is received from the UPnP control point on the UPnP network, the description request including UPnP control point information, the control unit determining whether or not to allow the connection with the UPnP control point that transmits the description request by matching the UPnP control point information in the description request with either allowed UPnP control point information in the configuration file or denied UPnP control point information in the configuration file; and
  an interface unit for performing the UPnP service connection with the UPnP control point of which connection is allowed based on the determined result of the control unit.

11. The UPnP device according to claim 10, wherein the configuration file contains a friendly name and IP address of the UPnP control point on the UPnP network or arbitrary information for distinguishing the UPnP control point from other UPnP control points.

12. The UPnP device according to claim 10, wherein the control unit transmits a dummy device description through the communication unit to the UPnP control point of which connection is denied based on the determined result of the control unit.

13. A connecting method using devices based on a universal plug and play (UPnP) network, the method comprising:
  a memory storing a configuration file for allowance or denial of a connection with a UPnP device in a UPnP control point before a UPnP service connection;
  allowing the UPnP control point to transmit an SSDP a simple service discovery protocol (SSDP) search request to the UPnP device on the UPnP network;
  when an SSDP response corresponding to the SSDP search request is received from the UPnP device, the SSDP response including UPnP device information, the UPnP control point to determine whether or not to allow the connection with the UPnP device that transmits the SSDP response by matching the UPnP device information with either allowed UPnP device information in the configuration file or denied UPnP device information in the configuration file; and
  when the connection with the UPnP device is allowed based on the determined result, allowing the UPnP control point to send a description request to the UPnP device of which connection is allowed based on the determined result.

14. The method according to claim 13, wherein the configuration file contains a friendly name and IP address of the UPnP device on the UPnP network or arbitrary information for distinguishing the UPnP device from other UPnP devices.

15. A connecting method using devices based on a universal plug and play (UPnP) network, the method comprising:
  a memory storing a configuration file for allowance or denial of a connection with a UPnP control point in a UPnP device before a UPnP service connection;
  when an SSDP a simple service discovery protocol (SSDP) search request is received by the UPnP device from the UPnP control point on the UPnP network, the SSDP search request including UPnP control point information, the UPnP device to determine whether or not to allow the connection with the UPnP control point that transmits the SSDP search request by matching the UPnP control point information with either allowed UPnP control point information in the configuration file or denied UPnP control point information in the configuration file; and
  when the connection with the UPnP control point is allowed based on the determined result, allowing the UPnP device to transmit an SSDP response to the UPnP control point of which connection is allowed based on the determined result.

16. The method according to claim 15, wherein the configuration file contains a friendly name and IP address of the UPnP control point on the UPnP network or arbitrary information for distinguishing the UPnP control point from other UPnP control points.

17. A connecting method using devices based on a universal plug and play (UPnP) network, the method comprising:
  a memory storing a configuration file for allowance or denial of a connection with a UPnP device in a UPnP control point before a UPnP service connection;

when an advertisement of a general event notification architecture (GENA) is received by the UPnP control point from the UPnP device on the UPnP network, the advertisement including UPnP device information, the UPnP control point to determine whether or not to allow the connection with the UPnP device that transmits the advertisement by matching the UPnP device information in the advertisement with either allowed UPnP device information in the configuration file or denied UPnP device information in the configuration file; and when the connection with the UPnP device is allowed based on the determined result, allowing the UPnP control point to perform the UPnP service connection with the UPnP device of which connection is allowed based on the determined result.

18. The method according to claim 17, wherein the configuration file contains a friendly name and IP address of the UPnP device on the UPnP network or arbitrary information for distinguishing the UPnP device from other UPnP devices.

19. A connecting method using devices based on a universal plug and play (UPnP) network, the method comprising:
- a memory storing a configuration file for allowance or denial of a connection with a UPnP control point in a UPnP device before a UPnP service connection;
- allowing the UPnP device to transmit an advertisement in a general event notification architecture (GENA) to the UPnP control point on the UPnP network;
- when a description request corresponding to the advertisement is received by the UPnP device from the UPnP control point on the UPnP network, the description request including UPnP control point information, the UPnP device to determine whether or not to allow the connection with the UPnP control point that transmits the description request by matching the UPnP control point information in the description request with either allowed UPnP control point information in the configuration file or denied UPnP control point information in the configuration file; and
- when the connection with the UPnP control point is allowed based on the determined result, allowing the UPnP device to send a device description to the UPnP control point of which connection is allowed based on the determined result.

20. The method according to claim 19, wherein the configuration file contains a friendly name and IP address of the UPnP control point on the UPnP network or arbitrary information for distinguishing the UPnP control point from other UPnP control points.

21. The method according to claim 19, wherein the allowing the UPnP device to send a device description to the UPnP control point further includes,
when the connection with the UPnP control point is denied based on the determined result, allowing the UPnP device to send a dummy device description to the UPnP control point of which connection is denied based on the determined result.

* * * * *